US012607591B2

(12) United States Patent
Steck

(10) Patent No.: US 12,607,591 B2
(45) Date of Patent: Apr. 21, 2026

(54) FLUX-LIMITING POLYMER MEMBRANE

(71) Applicant: Roche Diabetes Care, Inc., Indianapolis, IN (US)

(72) Inventor: Alexander Steck, Hirschberg (DE)

(73) Assignee: Roche Diabetes Care, inc., Indianapolis, IN (US)

( * ) Notice: Subject to any disclaimer, the term of this patent is extended or adjusted under 35 U.S.C. 154(b) by 249 days.

(21) Appl. No.: 18/320,711

(22) Filed: May 19, 2023

(65) Prior Publication Data

US 2023/0288365 A1 Sep. 14, 2023

Related U.S. Application Data

(63) Continuation of application No. PCT/EP2021/082059, filed on Nov. 18, 2021.

(30) Foreign Application Priority Data

Nov. 20, 2020 (EP) .................................... 20208847

(51) Int. Cl.
*G01N 27/333* (2006.01)
*G01N 27/327* (2006.01)

(52) U.S. Cl.
CPC ..... *G01N 27/3335* (2013.01); *G01N 27/3272* (2013.01)

(58) Field of Classification Search
None
See application file for complete search history.

(56) References Cited

U.S. PATENT DOCUMENTS

| | | | |
|---|---|---|---|
| 5,543,326 | A | 8/1996 | Heller et al. |
| 7,592,151 | B2 | 9/2009 | Liu et al. |
| 9,662,055 | B2 | 5/2017 | Hoss et al. |
| 2005/0173245 | A1 | 8/2005 | Feldman et al. |
| 2009/0298104 | A1 | 12/2009 | Liu et al. |
| 2011/0017595 | A1 | 1/2011 | Mao et al. |
| 2023/0288365 | A1 | 9/2023 | Steck |

FOREIGN PATENT DOCUMENTS

| | | | |
|---|---|---|---|
| JP | 2005-520172 | A | 7/2005 |
| RU | 2 641 966 | C2 | 1/2018 |
| TW | 201439528 | A | 10/2014 |
| WO | WO 03/085372 | A2 | 10/2003 |
| WO | WO 2007/147475 | A1 | 12/2007 |
| WO | WO 2010/028708 | A1 | 3/2010 |
| WO | WO 2012/130841 | A1 | 10/2012 |
| WO | WO 2014/001382 | A1 | 1/2014 |

OTHER PUBLICATIONS

International Search Report and Written Opinion of the International Searching Authority, PCT/EP2021/082059, Feb. 10, 2022, 9 pages.
Byčuk, Obtaining and Properties of Polymeric Films based on Poly-3-hydroxybutyrate and Polycaprolactone, Doctoral Dissertation, Moscow, 2016, 2 pages.
Sutâgin et al., Chemistry and Physics of Polymers, 2003, pp. 132-173.

*Primary Examiner* — J. Christopher Ball
(74) *Attorney, Agent, or Firm* — Bose McKinney & Evans LLP

(57) ABSTRACT

This disclosure generally relates to a flux-limiting polymer membrane for an analyte sensor and to an analyte sensor having a flux-limiting polymer membrane.

20 Claims, 2 Drawing Sheets

FLUX-LIMITING POLYMER MEMBRANE

RELATED APPLICATIONS

This application is a continuation of International Patent Application No. PCT/EP2021/082059, filed Nov. 18, 2021, which claims priority to EP 20 208 847.2, filed Nov. 20, 2020, both of which are hereby incorporated herein by reference.

BACKGROUND

This disclosure generally relates to a flux-limiting polymer membrane for an analyte sensor and to an analyte sensor comprising a flux-limiting polymer membrane.

Monitoring certain body functions, more particularly, monitoring one or more concentrations of certain analytes, plays an important role in the prevention and treatment of various diseases.

Along with so-called point measurements in which a sample of a body fluid is specifically taken from a user and investigated for the analyte concentration, continuous measurements are increasingly becoming available. Hence, there is an increasing demand for accurate analyte sensors that enable reliable and cost-efficient analyte detection from a body fluid or other samples. An analyte sensor for determining the concentration of an analyte under in vivo conditions is known from WO 2010/028708 A1. Another example of such sensor is disclosed in WO 2012/130841 A1. Moreover, WO 2007/147475 A1 discloses an amperometric sensor configured for implantation into a living body to measure the concentration of an analyte in a body fluid. An alternative sensor element is disclosed in WO 2014/001382 A1.

WO 03/085372 relates to biosensor membranes composed of polymers containing heterocyclic nitrogens. While these polymers have been found to be useful as a flux- (or diffusion-) limiting membrane for analyte sensors, they frequently show undesirably long run-in times and/or exhibit strong changes in the sensitivity throughout their lifetime. This is challenging in particular when storing the sensors for extended time periods before use.

SUMMARY

This disclosure teaches an analyte sensor comprising a working electrode and a flux-limiting polymer membrane disposed over the working electrode, which avoids the above-mentioned disadvantages. In particular, this disclosure provides a sensor having an increased stability over its lifetime and/or a short run-in time.

The analyte sensor according to this disclosure is advantageous as it has an improved stability over its lifetime and/or a short run-in time while maintaining sufficient sensitivity.

According to a first aspect of this disclosure, an analyte sensor comprises at least one working electrode and a flux-limiting polymer membrane disposed over the at least one working electrode is provided, wherein the flux-limiting polymer membrane comprises a poly(vinylpyridine)-based polymer, which has the following formula (I):

(I)

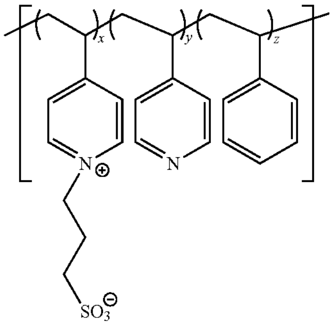

wherein x is about 2 to about 8 mol-%;

y is about 72 to about 98 mol-%; and z is 0 to about 20 mol-%.

A further aspect of this disclosure relates to a polymer membrane for use in an analyte sensor, particularly for use as a flux-limiting polymer membrane in an analyte sensor, wherein the polymer membrane comprises a polymer having the formula (I) as indicated above.

Still a further aspect of this disclosure relates to a liquid composition comprising a polymer having the formula (I) as indicated above, a crosslinker, and a solvent.

Still a further aspect of this disclosure relates to a method for manufacturing an analyte sensor, wherein the method comprises the steps:

a) providing a substrate comprising a first side and a second side, and at least one working electrode positioned on the first side of the substrate, and b) forming a layer of a flux-limiting polymer membrane over the at least one working electrode, wherein the flux-limiting polymer membrane comprises a polymer, which has the formula (I) as indicated above.

In particular embodiments, x is about 5 mol %; y is about 85 mol % and z is about 10 mol %.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation, in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "membrane," "layer," and "electrode," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

This disclosure relates to an analyte sensor comprising at least one working electrode and a flux-limiting polymer membrane disposed over the at least one working electrode, a polymer membrane for use in an analyte sensor, a liquid composition comprising a polymer, a crosslinker and a solvent, and a method for manufacturing an analyte sensor.

The term "analyte sensor" as used herein is a broad term and is to be given its ordinary and customary meaning to a person of ordinary skill in the art and is not to be limited to a special or customized meaning. The term specifically may refer, without limitation, to an arbitrary element or device configured for detecting or for measuring the concentration of the at least one analyte. The analyte sensor specifically may be an analyte sensor suitable for at least partial implantation into a body tissue of a user, more specifically an analyte sensor for continuous monitoring of the analyte.

In particular embodiments, the analyte sensor of this disclosure is an electrochemical sensor comprising a working electrode and at least one further electrode and respective circuitry. More particularly, the sensor is an amperometric electrochemical sensor comprising at least one working electrode. Typically, the analyte sensor comprises at least one further electrode, particularly a counter electrode and/or a reference electrode or a combined counter/reference electrode.

In certain embodiments, the analyte sensor is a two-electrode sensor particularly comprising one working electrode and one combined counter/reference electrode.

The term "working electrode" as used herein, is a broad term and is to be given its ordinary and customary meaning to a person of ordinary skill in the art and is not to be limited to a special or customized meaning. The term specifically may refer, without limitation, to the electrode of the analyte sensor that is sensitive for the analyte. The working electrode may be disposed on the at least one first side of at least one substrate. In particular, the working electrode comprises at least one conductive material and at least one sensing material, wherein said at least one sensing material is applied to an application area on the conductive material on the first side of the sensor substrate. The working electrode is sensitive for the analyte to be measured at a polarization voltage which may be applied between working and reference electrodes and which may be regulated by a potentiostat. A measurement signal may be provided as an electric current between the counter electrode and the working electrode. A separate counter electrode may be absent and a pseudo reference electrode may be present, which may also work as a counter electrode. Thus, an analyte sensor typically may comprise a set of at least two, in an embodiment a set of three electrodes. Particularly, the sensing material is present in the working electrode only.

A layer of sensing material may be present on the working electrode only and may typically be absent from any further electrodes, e.g., the counter electrode and/or the reference electrode may not comprise a layer of the sensing material.

Particularly, the analyte sensor according to this disclosure may be fully or a partially implantable and may, thus, be adapted for performing the detection of the analyte in the body fluid in a subcutaneous tissue, in particular, in an interstitial fluid. Other parts or components may remain outside of the body tissue. For example, as used herein, the terms "implantable" or "subcutaneous" refer to be fully or at least partly arranged within the body tissue of the user. For this purpose, the analyte sensor may comprise an insertable portion, wherein the term "insertable portion" may generally refer to a part or component of an element configured to be insertable into an arbitrary body tissue. The insertable portion may comprise the working electrode and typically at least one further electrode, e.g., a counter, reference and/or combined counter/reference electrode. In certain embodiments, the working electrode is positioned on a first side of the substrate, the at least one further electrode is positioned on the second side of the substrate and all electrodes are positioned on the insertable portion. The part of the sensor, which is not inserted, is the upper part of the sensor, which may comprise the contacts to connect the sensor to the electronics unit.

Further, the term "analyte" as used herein is a broad term and is to be given its ordinary and customary meaning to a person of ordinary skill in the art and is not to be limited to a special or customized meaning. The term specifically may refer, without limitation, to an arbitrary element, component or compound which may be present in a body fluid and the concentration of which may be of interest for a user. Specifically, the analyte may be or may comprise an arbitrary chemical substance or chemical compound, which may take part in the metabolism of the user, such as at least one metabolite. As an example, the at least one metabolite may be selected from the group consisting of glucose, cholesterol, triglycerides, lactate; more specifically the analyte may be glucose. Additionally or alternatively, however, other types of analytes and/or any combination of analytes may be determined.

The analyte sensor may be configured for at least partial implantation, specifically transcutaneous insertion, into a body tissue of a user; more specifically, the analyte sensor may be configured for continuous monitoring of the analyte, even more specifically, the analyte sensor may be configured for continuous glucose monitoring.

The analyte sensor of this disclosure comprises at least one flux-limiting polymer membrane, wherein the at least one flux-limiting polymer membrane is disposed over the working electrode, which means that at least one flux-limiting polymer membrane at least partially covers the working electrode. In an embodiment of this disclosure, the flux limiting membrane fully covers the working electrode. The flux-limiting polymer membrane generally may selectively allow for one or more molecules and/or compounds to pass, whereas other molecules and/or compounds are stopped by the membrane. Specifically, the flux-limiting polymer membrane is permeable for the at least one analyte to be detected. Thus, as an example, the membrane may be permeable for one or more of glucose, lactate, cholesterol or other types of analytes. The at least one flux-limiting polymer membrane may hence function as a diffusion barrier that controls diffusion of the analyte from the exterior, e.g., the body fluid surrounding the analyte sensor, to the sensing material, i.e., the enzyme molecules in the sensing material.

In particular embodiments, the flux-limiting polymer membrane is permeable for glucose. For example, the flux-limiting polymer membrane may have a diffusion coefficient for glucose, which is at least about $1\times10^{-6}$ $cm^2/s$, preferably from about $1\times10^{-6}$ $cm^2/s$ to about $1\times10^{-10}$ $cm^2/s$. The diffusion coefficient for glucose may be determined by a diffusion cell and a flux-limiting membrane foil, which is produced by doctor blading on polypropylene.

The flux-limiting polymer membrane of this disclosure comprises a poly(vinylpyridine)-based polymer, which has the following formula (I):

(I)

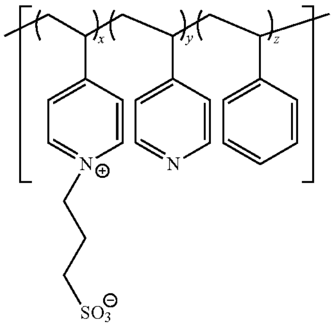

wherein x is about 2 to about 8 mol-%;

y is about 72 to about 98 mol-%; and z is 0 to about 20 mol-%.

The polymer of formula (I) comprises two or three different monomeric units, a 4-sulfonatopropyl-vinylpyridinium unit, a 4-vinylpyridine unit and optionally a styrene unit. In certain embodiments, the polymer consists of the above two or three different monomeric units. The parameters x, y and z in formula (I) indicate the relative molar amounts of the respective monomeric units within the polymer (i.e., mol-%).

In this disclosure, the parameter x corresponds to the relative molar amount of the 4-sulfonatopropyl-vinylpyridinium unit and is in the range of about 2 to about 8 mol-%, about 3 to about 7 mol-%, about 4 to about 6 mol-% and particularly about 5 mol-%.

The parameter y corresponds to the relative molar amount of the 4-vinylpyridine unit and is in the range of about 72 to about 98 mol-%, 82 to about 88 mol-%, about 83 to about 87 mol-%, about 84 to about 86 mol-% and particularly about 85 mol-%.

The parameter z corresponds to the relative amount of the styrene unit and it is in the range of 0 to about 20 mol-%, about 7 to about 13 mol-%, about 8 to about 12 mol-%, about 9 to about 11 mol-% and particularly about 10 mol-%.

The sum of the mol-% of parameters x, y, and z usually add up to 100 mol-%.

In certain embodiments, the polymer of the formula (I) is a statistical copolymer, i.e., the individual monomeric units are randomly incorporated into the polymer chain.

In certain embodiments, the polymer has a weight average molecular weight of about 60 kDa to about 200 kDa, of about 80 kDa to about 160 kDa, of about 100 kDa to about 140 kDa and particularly of about 120 kDa. In certain embodiments, the polymer has a number average molecular weight of about 40 kDa to about 90 kDa, from about 50 kDa to about 70 kDa and particularly of about 60 kDa. In certain embodiments, the polymer has a polydispersity index of about 1.4 to about 3, and particularly of about 2.

In particular embodiments, the polymer has a weight average molecular weight, a number average molecular weight and optionally a polydispersity index as indicated above.

The above molecular weights relate to a polymer of formula (I) in a non-crosslinked state. The weight average molecular weight and the number average molecular weight are measured via GPC, using PMMA (polymethylmethacrylate) as standard. The polydispersity is the ratio of the weight average molecular weight to the number average molecular weight.

The polymer of formula (I) may be manufactured by known methods, e.g., as described WO 03/085372, e.g., by reacting a poly(4-vinylpyridine-co-styrene) copolymer, particularly a statistical poly(4-vinylpyridine-co-styrene) copolymer, comprising a relative amount of x+y mol-% of the 4-vinylpyridine unit and a relative amount of z mol-% of the styrene unit, wherein x, y, and z are defined as indicated above, with 1,3-propane sultone under conditions where the 4-sulfonatopropyl-vinylpyridinium unit is formed in a relative amount of x mol-%.

In certain embodiments, the polymer of formula (I) in the flux-limiting polymer membrane is crosslinked by a crosslinker. A crosslinker is a molecule that contains at least two functional groups capable of linking at least two molecules together or linking at least two portions of the same molecule together. Linking of at least two molecules is called intermolecular crosslinking, while linking of at least two portions of the same molecule is called intramolecular crosslinking. A crosslinker having more than two functional groups may be capable of both intermolecular and intramolecular crosslinkings at the same time.

The crosslinker is capable of reacting with functional groups on the polymer, particularly with the alkyl-sulfonate group and/or the pyridine group. The polymer of the flux-limiting polymer membrane of this disclosure is crosslinked by an amount of crosslinker to provide sufficient crosslinking of the polymer. For example, the weight ratio of polymer to crosslinker in the flux-limiting polymer membrane is about 8:1 (w/w) to about 16:1 (w/w), about 10:1 (w/w) to about 14:1 (w/w) and particularly about 12:1 (w/w).

Specifically, the flux-limiting polymer membrane may comprise at least one crosslinker selected from UV-curable crosslinkers and chemical crosslinkers; more specifically, the sensing material comprises a chemical crosslinker.

The term "chemical crosslinker" as used herein, is a broad term and is to be given its ordinary and customary meaning to a person of ordinary skill in the art and is not to be limited to a special or customized meaning. The term specifically may refer, without limitation, to a crosslinker that is capable of initiating a chemical reaction generating a crosslinked molecular network and/or a crosslinked polymer when exposed to heat. "Exposed to heat" may refer to being exposed to a temperature above 15° C., specifically to a temperature above 20° C.; more specifically to a temperature in the range from 20° C. to 50° C. and even more specifically to a temperature in the range from 20° C. to 25° C. More specifically, chemical crosslinkers may initiate crosslinking of the layer of the sensing material when exposed to heat.

Suitable chemical crosslinkers according to this disclosure are selected from: epoxide-based crosslinkers, such as diglycidyl ethers like poly(ethylene glycol) diglycidyl ether (PEG-DGE) and poly(propylene glycol) diglycidyl ether; trifunctional short-chain epoxides; anhydrides; diglycidyl ethers such as resorcinol diglycidyl ether, bisphenol, e.g., bisphenol A diglycidyl ether, diglycidyl 1,2-cyclohexanedicarboxylate, poly(ethylene glycol) diglycidyl ether, glycerol diglycidyl ether, 1,4-butanediol diglycidyl ether, poly(propylene glycol) diglycidyl ether, poly(dimethylsiloxane), diglycidyl ether, neopentyl glycol diglycidyl ether, 1,2,7,8-diepoxyoctane, 1,3-glycidoxypropyl-1,1,3,3-tetramethyldisioxane; triglycidyl ethers such as N,N-diglycidyl-4-glycidyloxyaniline, trimethylolpropane triglycidyl ether; tetraglycidyl ethers such as tetrakisepoxy cyclosiloxane, pentaerythritol tetraglycidyl ether, tetraglycidyl-4,4'-methylenebisbenzenamine.

In certain embodiments, the chemical crosslinker is PEG-DGE having a number average molecular weight of about 200 Da or more, e.g., a number average molecular weight of about 200 Da. In further embodiments, the crosslinker is N,N-diglycidyl-4-glycidyloxyaniline. For example, the crosslinker may be selected from the group consisting of PEG-DGE having a number average molecular weight of 200 Da and N,N-diglycidyl-4-glycidyloxyaniline.

The term "UV-curable" as used herein, is a broad term and is to be given its ordinary and customary meaning to a person of ordinary skill in the art and is not to be limited to a special or customized meaning. The term specifically may refer, without limitation, to the ability of a chemical substance, for example, a crosslinker, of initiating a photochemical reaction generating a crosslinked molecular network and/or a crosslinked polymer when irradiated by light in the UV spectral range. More specifically, UV-curable crosslinkers may initiate crosslinking of the layer of the sensing material when irradiated by UV light. Crosslinking may in particular be initiated as indicated herein below.

Suitable UV curable crosslinkers according to this disclosure include benzophenone, diazirine and azide. Particularly suitable UV-curable crosslinkers are, for example, selected from the group consisting of, benzophenone comprising crosslinkers, poly(di(2-hydroxy-3-aminobenzo-phenonepropylene) glycol), dibenzophenone 1,2-cyclohexanedicarboxylate, bis[2-(4-azidosalicylamido)ethyl] disulfide, reaction products of the reaction of 4-aminobenzophenone with any one of the above for the chemical crosslinker described diglycidyl crosslinkers, triglycidyl crosslinkers and tetraglycidyl crosslinkers, an example of such a reaction product is 2,4,6,8-tetramethyl-2,4,6,8-tetrakis(2-hydroxy-3-aminpropylbenzophenone)-cyclotetrasiloxane, and reaction products of the reaction of 4-benzoylbenzoic acid N-succinimidyl ester with a diamine or a jeffamine.

In certain embodiments, the crosslinker comprises two, three or more functional groups. Particular examples of functional groups are epoxide groups. Preferably, the crosslinker comprises at least two functional epoxide groups and more preferably three functional epoxide groups. More preferably, the cross-linker is a triglycidyl ether. An especially preferred example of a crosslinker is N,N-diglycidyl-4-glycidyloxyaniline.

The flux-limiting polymer membrane may have a thickness sufficient for providing mechanical stability. The flux-limiting polymer membrane specifically may have a thickness of about 1 μm to about 150 μm.

In addition to the above polymer and the crosslinker, the flux-limiting polymer membrane may also comprise further components, e.g., polymeric components and/or non-polymeric components, wherein the non-polymeric components may be dispersed and/or dissolved in the polymer. Non-polymeric components include plasticizers, particularly biocompatible plasticizers, such as tri-(2-ethylhexyl) trimellilate and/or glycerol.

Further components optionally present in the polymer membrane are pharmaceutical agents, corticoids, heparin and salts, e.g., salts comprising ions such as $Na^+$, $Cl^-$ and/or $Br^-$.

In certain embodiments, the membrane comprises the poly(vinylpyridine)-based polymer of the formula (I) as the only polymer component.

The flux-limiting polymer membrane of this disclosure may be applied to the analyte sensor by a coating process, particularly as a liquid composition by a wet-coating process.

As used herein, the term "coating process" may refer to an arbitrary process for applying at least one layer to at least one surface of an arbitrary object. The applied layer may cover the object, for example, the working electrode, completely or may only cover a part or parts of the object. The layer may be applied via a coating process wherein a material is provided, e.g., in a liquid form, exemplarily as a suspension or as a solution, and may be distributed on the surface. Specifically, the coating process may comprise a wet-coating process selected from the group consisting of: spin-coating; spray-coating; doctor-blading; printing; dispensing; slot-coating; and dip-coating. A preferred wet-coating process is dip-coating or spray-coating.

After application, the liquid composition may be subjected to at least one curing step wherein in the curing step at least a part of the polymer is crosslinked. The terms "crosslinking" and "curing" are interchangeably used herein. Suitable ways for initiating crosslinking depend on the type of crosslinker and are known by the person skilled in the art. As the preferred crosslinker is a chemical crosslinker, the curing is preferably carried out essentially at ambient temperature or up to about 90° C., without UV light. The term "ambient temperature" as used herein is understood as a temperature specifically between 15° C. and 30° C., more specifically between 20° C. and 25° C. Curing using UV-curable crosslinkers is generally induced by irradiation using UV light. As used herein, the term "UV light" generally refers to electromagnetic radiation in the ultraviolet spectral range. The term "ultraviolet spectral range" generally refers to electromagnetic radiation in the range of 1 nm to 380 nm, preferably light in the range of 100 nm to 380 nm. The curing usually may take place at room temperature.

Further, after application, the liquid composition may be subjected to at least one drying step. Specifically, the curing step and the drying may be performed at the same time, particularly when using a chemical crosslinker. Alternatively, the drying step may be performed after the curing step. Specifically, the composition may be dried for about 10 minutes or less, or about 5 minutes or less, e.g., about 0.5 to about 10 minutes at ambient temperature or up to about 50° C.

The analyte sensor of this disclosure comprises at least one working electrode. In certain embodiments, the analyte sensor comprises (i) a substrate comprising
a first side and a second side, and
at least one conductive material positioned on the first side of the substrate,
(ii) a working electrode comprising a sensing material, which at least partially covers the first side of the substrate, wherein the sensing material comprises at least one enzyme, and
(iii) a polymer membrane comprising a polyvinyl pyridine-based polymer of formula (I), wherein the membrane at least partially covers the working electrode.

The term "substrate" as used herein, is a broad term and is to be given its ordinary and customary meaning to a person of ordinary skill in the art and is not to be limited to a special or customized meaning. The term "substrate" is synonymously used with the term "sensor substrate" and specifically may refer, without limitation, to any kind of material or combination of materials, which is suitable to form a polymer layer to cover the working electrode and described herein. In particular, a "sensor substrate" as understood herein may comprise electrically insulating material.

The term "layer," as used herein, is a broad term and is to be given its ordinary and customary meaning to a person of ordinary skill in the art and is not to be limited to a special or customized meaning. The term specifically may refer, without limitation, to an element of a layer setup of the analyte sensor. Specifically, the term "layer" may refer to an arbitrary covering of an arbitrary substrate, specifically of a flat substrate. The layer may specifically have a lateral extension exceeding its thickness by at least a factor of 2, at least a factor of 5, at least a factor of 10, or even at least a factor of 20 or more. Specifically, the analyte sensor may have a layer setup. The analyte sensor may comprise a plurality of layers such as the at least one conductive material, the at least one layer of the at least one sensing material, and optionally at least one membrane layer. One or more of the layers of the analyte sensor may comprise sub-layers. For example, a layer comprising the conductive material may comprise at least one further layer.

The term "electrically insulating material," as used herein, is a broad term and is to be given its ordinary and customary meaning to a person of ordinary skill in the art and is not to be limited to a special or customized meaning. "Electrically insulating material" may also refer to a dielectric material. The term specifically may refer, without limitation, to a material or combination of materials which prevent the transfer of electrical charges and which do not sustain a significant electrical current. Specifically, without limiting other possibilities, the at least one electrically insulating material may be or may comprise at least one insulating resin, such as insulating epoxy resins used in manufacturing electronic printed circuit boards; in particular it may comprise or be a thermoplastic material such as polycarbonate, polyester like polyethylene terephthalate (PET), polyvinyl chloride (PVC), polyurethane, polyether, polyamide, polyimide or a copolymer thereof, such as glycol modified polyethylene terephthalate, polyethylene naphthalate, polytetrafluoroethylene (PTFE) or alumina.

In the method and in the analyte sensor according to this disclosure, the sensor substrate may comprise two opposing sides, at least a first side and at least a second side opposing the first side.

Specifically, the analyte sensor, more specifically the sensor substrate, may additionally comprise at least one further electrode, wherein the at least one further electrode may comprise at least one of a reference electrode and a counter electrode. In an embodiment, the at least one further electrode comprises a combined counter/reference electrode. In particular, the reference electrode may comprise at least one reference electrode conductive material; and/or the counter electrode may comprise at least one counter electrode conductive material. More specifically, the at least one further electrode may be disposed on at least one of: the first side and the second side opposing the first side of the sensor substrate.

The term "conductive material," as used herein, is a broad term and is to be given its ordinary and customary meaning to a person of ordinary skill in the art and is not to be limited to a special or customized meaning. The term specifically may refer, without limitation, to a conductive strip, layer, wire or other type of elongated electrical conductor. More specifically, the term "conductive material" may refer, without limitation, to a material, which is conductive and hence capable of sustaining an electrical current, for example, the conductive material may comprise at least one material selected from the group consisting of: carbon; carbon paste; gold; copper; silver; nickel; platinum; palladium. Specifically, the conductive material may be or may comprise at least one metal, such as one or more of gold, copper, silver, nickel, palladium or platinum. Additionally or alternatively, the at least one conductive material may be or may comprise at least one conductive compound, such as at least one conductive organic or inorganic compound. Additionally or alternatively, the at least one conductive material may be or may comprise at least one nonmetallic conductive material, e.g., polyaniline, poly-3,4-ethylenedioxythiophene (PEDOT), carbon or carbon paste. Carbon paste specifically may relate to a material comprising carbon, a solvent such as diethyleneglycol butyl ether, and at least a binder such as vinyl chloride co- and terpolymers. Preferably, the conductive material according to this disclosure may comprise gold and/or carbon; more preferably, the conductive material may consist of gold and/or carbon and/or carbon paste. Specifically the conductive material may comprise gold and a further material, for example, carbon.

Moreover, the conductive material may comprise at least one further layer of at least one further material; specifically the further layer may comprise a further conductive material. More specifically the further layer of the conductive material may comprise or may consist of carbon. The further material may be disposed on the first side. Using a further layer, in particular carbon, may contribute to efficient electron transfer by the conductive material.

The conductive material may have a thickness of at least about 0.1 μm, preferably of at least about 0.5 μm, more preferably of at least about 5 μm, specifically of at least about 7 μm, or at least about 10 μm. In the case where the conductive material comprises carbon or is carbon, the conductive material may specifically have a thickness of at least about 7 μm, more specifically of at least about 10 μm, for example, about 10 μm to 15 μm. Specifically, in the case where the conductive material is gold, the conductive material may have a thickness of at least about 100 nm, more specifically of at least about 500 nm.

A minimum thickness as specified above may be advantageous as it ensures proper electron transport. A thickness below the specified values is usually not sufficient for reliable electron transport. Even more specifically, the thickness should not exceed a value of about 30 μm in the case of carbon and a value of about 5 μm in the case of gold. If the thickness is too large, the overall thickness and hence the size of the analyte sensor may increase. Larger analyte sensor sizes are generally unwanted as they may cause difficulties when being implanted. Further, they may be less flexible, in particular in the case of carbon and/or they may be expensive, in particular in the case of gold.

The conductive material may be hydrophobic. For example, the contact angle of the conductive material with water may in the range from 60° to 140°, in particular about 100°, determined via microscopy, for example, using a Keyence VHX-100, with a water droplet volume of 5 μl.

The conductive material may further comprise a rough surface. A rough surface usually increases the efficiency of electron transfer. Further, it increases the hydrophobicity. A rough surface means that the surface may comprise unevenness. The depth of this unevenness may, for example, be in the range from 1 μm to 6 μm, such as about 3 μm, determined via light scanning microscopy, in particular via laser scanning microscopy. The distance between two rises in the rough surface may, for example, be in the range from 20 μm to 80 μm, such as about 40 μm, determined via light scanning microscopy, in particular via laser scanning microscopy.

The terms "reference electrode conductive material" and "counter electrode conductive material," as used herein, are broad terms and are to be given its ordinary and customary meaning to a person of ordinary skill in the art and are not to be limited to a special or customized meaning. The terms specifically may refer, without limitation, to a conductive strip, layer, wire or other type of elongated electrical conductor present on a reference electrode or a counter electrode, respectively. More specifically, the terms may refer, without limitation, to a material, which is conductive, and hence capable of sustaining an electrical current, for example, the reference electrode conductive material and/or the counter electrode conductive material may comprise at least one material as specified herein above with respect to the conductive material. In addition to the materials listed above, the reference electrode conductive material and/or the counter electrode conductive material may specifically comprise Ag/AgCl.

The term "sensing material," as used herein, is a broad term and is to be given its ordinary and customary meaning to a person of ordinary skill in the art and is not to be limited to a special or customized meaning.

The sensing material comprises at least one enzyme; specifically the enzyme is capable of catalyzing a chemical reaction consuming at least the analyte; specifically the enzyme may be an $H_2O_2$ generating and/or consuming enzyme; even more specifically a glucose oxidase (EC 1.1.3.4), a hexose oxidase (EC 1.1.3.5), an (S)-2-hydroxy acid oxidase (EC 1.1.3.15), a cholesterol oxidase (EC 1.1.3.6), a glucose dehydrogenase EC 1.1.1.47), a galactose oxidase (EC 1.1.3.9), an alcohol oxidase (EC 1.1.3.13), an L-glutamate oxidase (EC 1.4.3.11) or an L-aspartate oxidase (EC 1.4.3.16); even more specifically a glucose oxidase (GOx) including any modification thereof.

Further, the sensing material may comprise a crosslinker, e.g., a chemical crosslinker or a UV crosslinker as crosslinker as described above.

Further, the sensing material may comprise at least one polymeric transition metal complex. The term "polymeric transition metal complex" specifically may refer, without limitation, to a material that may be or may comprise at least a polymeric material; specifically it may be or may comprise at least a polymeric material and at least a metal containing complex. The metal containing complex may be selected from the group of transition metal element complexes, specifically the metal containing complex may be selected from osmium-complexes, ruthenium-complexes, vanadium-complexes, cobalt-complexes, and iron-complexes, such as ferrocenes, such as 2-aminoethylferrocene. Even more specifically, the sensing material may comprise a polymeric transition metal complex as described, for example, in WO 01/36660 A2, the content of which is included by reference. In particular, the sensing material may comprise a modified poly (vinylpyridine) backbone loaded with poly(biimidizyl) Os complexes covalently coupled through a bidentate linkage. A suitable sensing material is further described in Feldmann et al, Diabetes Technology & Therapeutics, 5 (5), 2003, 769-779, the content of which is included by reference. Suitable sensing materials further may include ferrocene-containing polyacrylamide-based viologen-modified redox polymer, pyrrole-2,2'-azino-bis(3-ethylbenzthiazoline-6-sulfonic acid) (ABTS)-pyrene, naphthoquinone-LPEI. The polymeric transition metal complex may represent a redox mediator incorporated into a cross-linked redox polymer network. This is advantageous as it may facilitate electron transfer between the at least one enzyme or analyte and the conductive material. In order to avoid a sensor drift, the redox mediator and the enzyme may be covalently incorporated into a polymeric structure.

In certain embodiments, the sensing material comprises an enzyme capable of catalyzing a chemical reaction consuming at least the analyte, particularly an $H_2O_2$ generating and/or consuming enzyme, a crosslinker and a polymeric transition metal complex. Specifically, the sensing material may comprise at least a polymeric transition metal complex and GOx and a chemical crosslinker. More specifically, the sensing material may comprise a modified poly(vinylpyridine) backbone loaded with poly(biimidizyl) Os complexes covalently coupled through a bidentate linkage, GOx and a chemical crosslinker like poly(ethylene glycol) diglycidylether (PEG-DGE). Suitable further sensing materials are known to the person skilled in the art.

In an embodiment, the sensing material may comprise a polymeric material and $MnO_2$-particles.

The sensing material according to this disclosure may, for example, comprise about 40-60 wt % of a polymeric transition metal complex; about 30-40 wt % of an enzyme capable of catalyzing a chemical reaction consuming at least the analyte, particularly a $H_2O_2$ generating and/or consuming enzyme, and about 0.5-25 wt % of a crosslinker based on the dry total weight of the sensing material.

After application to the substrate, the sensing material may be subjected to a at least one curing step wherein in the curing step at least a part of the sensing material is crosslinked. The curing step may be performed as described above. Specifically, the curing step may take place after application and before drying. Further, the curing step may take place before the optional laser irradiation or alternatively, at least partially after performing laser irradiation.

In certain embodiments, the analyte sensor further comprises at least one biocompatibility membrane disposed over the flux-limiting polymer membrane. The term "biocompatibility membrane" relates to a polymer membrane different from the polyvinyl pyridine-based flux-limiting polymer membrane as described above.

For example, the biocompatibility membrane may be a gel membrane, which, on one hand, may be permeable for the body fluid or at least for the analyte as comprised therein, and may on the other hand be impermeable for compounds comprised in the analyte sensor, in particular in the working electrode, thus preventing a migration thereof into the body tissue.

The biocompatibility layer may have a thickness of from about 1 μm to about 10 μm, in an embodiment of from about 3 μm to about 6 μm. More specifically, the biocompatibility layer covers the analyte sensor at least partly or completely. Even more specifically, the biocompatibility layer may be the outmost layer of the analyte sensor. The biocompatibility membrane layer may be or may comprise the following materials: methacrylate-based polymers and copolymers, acrylamide-methacrylate-based copolymers, biodegradable polysaccharides such as hyaluronic acid (HA), agarose, dextran, chitosan and a poly(vinylpyridine) based polymer. In case the biocompatibility membrane layer comprises a poly(vinylpyridine) based polymer this poly(vinylpyridine) based polymer may be the same or different from the poly(vinylpyridine) based polymer of the flux-limiting membrane. Preferably it is different from the poly(vinylpyridine) based polymer of the flux limiting membrane.

The biocompatibility membrane layer may be applied by techniques known to those skilled in the art, using at least one coating process, specifically a wet-coating process, as described above.

In certain embodiments, the analyte sensor does not comprise a biocompatibility membrane disposed over the flux-limiting polymer membrane. In these embodiments, the polyvinyl pyridine-based polymer of this disclosure may be the outmost layer of the analyte sensor. Thus, the flux-limiting polymer membrane may then also serve as biocompatibility membrane.

This disclosure further relates to a polymer membrane for use in analyte sensor, wherein the polymer membrane comprises a poly(vinylpyridine)-based polymer having the formula (I):

(I)

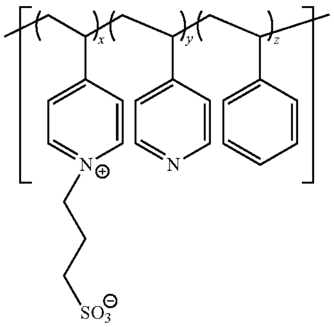

wherein x is about 2 to about 8 mol-%;

y is about 72 to about 98 mol-%; and z is 0 to about 20 mol-%.

Preferably, the features of the polymer membrane are as described above for the flux-limiting polymer membrane.

This disclosure further relates to a liquid composition suitable for applying a flux-limiting polymer membrane to an analyte sensor, comprising a polyvinyl pyridine-based polymer having the following formula (I):

(I)

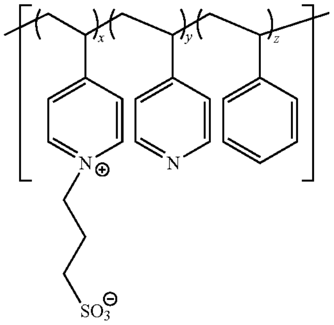

wherein x is about 2 to about 8 mol-%;

y is about 72 to about 98 mol-%; and z is 0 to about 20 mol-%;

a crosslinker, and a solvent.

Preferably, the features of the polyvinyl pyridine-based polymer and the crosslinker are as described above.

The solvent may comprise a non-aqueous organic solvent, particularly a water-miscible solvent such as methanol, ethanol, propanol, or any combination thereof, or a mixture of a non-aqueous organic solvent and water. Preferably, the non-aqueous organic solvent is ethanol. Preferably, the composition comprises from about 50% to about 90% (v/v) non-aqueous organic solvent, e.g., ethanol, and from about 10% to about 50% (v/v) water, preferably from about 70% to about 90% (v/v) non-aqueous organic solvent and from about 10% to about 30% (v/v) water, particularly about 80% (v/v) non-aqueous organic solvent, e.g., ethanol, and about 20% (v/v) water. In a further embodiment, the solvent consists of a non-aqueous solvent, in particular of ethanol.

In certain embodiments, the liquid composition may comprise from about 100 mg/ml to about 140 mg/ml polymer and from about 8 mg/ml to about 12 mg/ml crosslinker, particularly about 120 mg/ml polymer and about 10 mg/ml crosslinker. The weight ratio of polymer to crosslinker is preferably about 12:1.

This disclosure further relates to a method for manufacturing an analyte sensor comprising the steps:

a) providing a substrate comprising a first side and a second side, and at least one working electrode positioned on the first side of the substrate, and b) forming a flux-limiting polymer membrane over the at least one working electrode, wherein the flux-limiting polymer membrane comprises a poly(vinylpyridine) based polymer, which has the following formula (I):

(I)

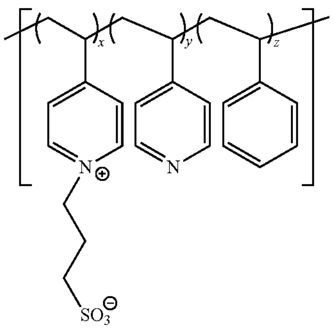

wherein x is about 2 to about 8 mol-%;

y is about 72 to about 98 mol-%; and z is 0 to about 20 mol-%.

Preferably, the features of the polymer membrane are as described above.

In certain embodiments, step b) comprises applying a liquid composition comprising the polymer, a crosslinker and a solvent onto the working electrode. Particularly, step b) comprises coating the least one working electrode with a liquid composition comprising the polymer, a crosslinker and a solvent, curing the polymer and drying. Preferably, the features of the liquid composition, the application step, the curing step and the drying step are as described above.

In certain embodiments of the method according to this disclosure, in addition to the at least one flux-limiting polymer membrane layer, at least a second membrane layer may be applied. Said second membrane layer may be a biocompatibility membrane layer, preferably a biocompatibility membrane layer as described above.

The method according to this disclosure may further comprise at least one diffusion step wherein, in the diffusion step the crosslinker comprised in the flux-limiting polymer membrane may at least partially diffuse into the sensing material. Diffusion may occur during applying the membrane layer to the sensing material. The diffusion of the crosslinker into the sensing material may allow for at least partial crosslinking of the sensing material independent of the amount of crosslinker in the sensing material when applying the sensing material to the substrate.

The diffusion step may further comprise a swelling of at least a part of the sensing material. The term "swelling" as used herein is a broad term and is to be given its ordinary and customary meaning to a person of ordinary skill in the art and is not to be limited to a special or customized meaning. The term specifically may refer, without limitation, to the binding of water and/or to the binding of water-soluble solvent such as ethanol, methanol, acetone to a material, specifically to the binding of water and/or of water-soluble solvent to the sensing material. Due to the uptake of water and/or the uptake of water-soluble solvent into the sensing material, diffusion of the crosslinker into the sensing material may advantageously be enabled which may be required for efficient crosslinking. Swelling may moreover refer to the uptake of water from the membrane layer.

To allow for sufficient swelling in the method according to this disclosure, the polymeric material in the sensing material may be capable of taking up of at least 10 wt.-% of water and/or solvent from the membrane layer based on the dry weight of the polymeric material within a time frame of several minutes, e.g., 1 to 15 minutes, more specifically at least 20 wt.-%, even more specifically at least 30 wt.-%, even more specifically up to 90 wt.-%.

This swelling and/or uptake of water and/or solvent is advantageous as diffusing of the crosslinker from the membrane layer into the sensing material may thereby be enabled.

Moreover, this disclosure relates to the use of the analyte sensor as described above for detecting at least one analyte in a sample; specifically in a sample of a body fluid. More particularly, the analyte sensor is a sensor for continuous glucose measurement.

As used herein, the term "body fluid" relates to all bodily fluids of a subject known to comprise or suspected to comprise the analyte of this disclosure, including interstitial fluid, blood, plasma, lacrimal fluid, urine, lymph, cerebrospinal fluid, bile, stool, sweat, and saliva. Generally, an arbitrary type of body fluid may be used. Preferably, the body fluid is a bodily fluid which is present in a body tissue of a user, such as in the interstitial tissue. Thus, as an example, the body fluid may be selected from the group consisting of blood and interstitial fluid. However, additionally or alternatively, one or more other types of body fluids may be used. The body fluid generally may be contained in a body tissue. Thus, generally, the detection of the at least one analyte in the body fluid may preferably be determined in vivo.

The term "sample" is understood by the skilled person and relates to any sub-portion of a bodily fluid. Samples can be obtained by well-known techniques including, e.g., venous or arterial puncture, epidermal puncture, and the like.

The terms "user" and "subject" are used interchangeably herein and are broad terms, which are to be given their ordinary and customary meanings to a person of ordinary skill in the art and are not to be limited to special or customized meanings. The terms specifically may refer, without limitation, to a human being or an animal, independent from the fact that the human being or animal, respectively, may be in a healthy condition or may suffer from one or more diseases. As an example, the subject may be a human being or an animal suffering from diabetes. However, additionally or alternatively, this disclosure may be applied to other types of subjects.

Moreover, this disclosure relates to a method for measuring an analyte in a sample comprising the analyte sensor described herein above.

The methods for measuring of an analyte of this disclosure, in particular, may be in vivo methods. Alternatively, the method of this disclosure may also encompass measuring of an analyte under in vitro conditions, e.g., in a sample of a body fluid obtained from a subject, particularly from a human subject. Specifically, said method may not comprise diagnosis of disease based on said measurement.

A still further aspect of this disclosure relates to a polymer, which has the following formula (Ia):

(Ia)

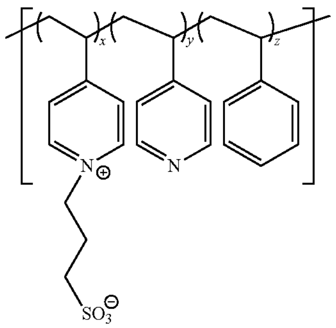

wherein x is about 2 to about 20 mol-%;

y is about 60 to about 98 mol-%; and z is about 0 to about 20 mol-%;

wherein the polymer is:

(i) a statistical polymer;

(ii) a polymer having a weight average molecular weight of about 60 kDa to about 200 kDa, and/or (iii) a polymer, which is crosslinked by a crosslinker, which is N,N-diglycidyl-4-glycidyloxyaniline, particularly wherein the weight ratio of polymer to crosslinker is about 8:1 (w/w) to about 16:1 (w/w), about 10:1 (w/w) to about 14:1 (w/w) and particularly about 12:1 (w/w).

Further aspects are an analyte sensor as herein described comprising the polymer of formula (Ia) and a polymer membrane as herein described comprising the polymer of formula (Ia), a liquid composition as herein described comprising the polymer of formula (Ia) and a method of manufacturing an analyte sensor comprising as herein described comprising using the polymer of formula (Ia).

Preferred features of the analyte sensor, the polymer membrane, the liquid composition and the manufacturing method are as described herein above for the polymer of formula (I).

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of this disclosure is not restricted by the preferred embodiments.

Summarizing and without excluding further possible embodiments, the following embodiments may be envisaged:

Embodiment 1: An analyte sensor comprising at least one working electrode and a flux-limiting polymer membrane disposed over the at least one working electrode, wherein the flux-limiting polymer membrane comprises a polymer, which has the following formula (I):

(I)

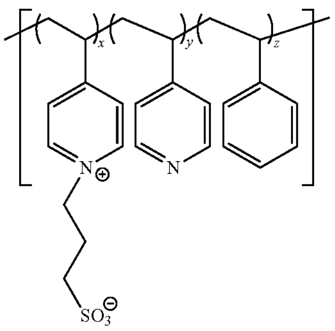

wherein x is about 2 to about 8 mol-%;
y is about 72 to about 98 mol-%; and
z is 0 to about 20 mol-%.

Embodiment 2: The analyte sensor of embodiment 1,
wherein x is about 2 to about 8 mol-%;
y is about 82 to about 88 mol-%; and
z is about 7 to about 13 mol-%.

Embodiment 3: The analyte sensor of embodiment 1 or 2,
wherein x is about 3 to about 7 mol-%;
y is about 83 to about 87 mol-%; and
z is about 8 to about 12 mol-%.

Embodiment 4: The analyte sensor of any one of embodiments 1-3,
wherein x is about 4 to about 6 mol-%;
y is about 84 to about 86 mol-%; and
z is about 9 to about 11 mol-%.

Embodiment 5: The analyte sensor of any one of embodiments 1-4,
wherein x is about 5 mol-%;
y is about 85 mol-%; and
z is about 10 mol-%.

Embodiment 6: The analyte sensor of any one of embodiments 1-5, wherein the polymer is a statistical copolymer.

Embodiment 7: The analyte sensor of any one of embodiments 1-6, wherein the polymer has a weight average molecular weight of about 60 kDa to about 200 kDa, of about 80 kDa to about 160 kDa, of about 100 kDa to about 140 kDa and particularly of about 120 kDa.

Embodiment 8: The analyte sensor of any one of embodiments 1-7, wherein the polymer has a number average molecular weight of about 4 kDa to about 90 kDa, from about 40 kDa to about 70 kDa and particularly of about 60 kDa.

Embodiment 9: The sensor of any one of embodiments 1-8, wherein the polymer has a polydispersity index of about 1.4 to about 3, and particularly of about 2.

Embodiment 10: The analyte sensor of any one of embodiments 1-9, wherein the polymer of formula (I) in the flux-limiting polymer membrane is crosslinked by a crosslinker.

Embodiment 11: The analyte sensor of embodiment 10, wherein the weight ratio of polymer to crosslinker in the flux-limiting polymer membrane is about 8:1 (w/w) to about 16:1 (w/w), about 10:1 (w/w) to about 14:1 (w/w) and particularly about 12:1 (w/w).

Embodiment 12: The analyte sensor of embodiment 10 or 11, wherein the crosslinker comprises at least one functional epoxide group.

Embodiment 13: The analyte sensor of any one of embodiments 10-12, wherein the crosslinker comprises at least two and particularly three functional epoxide groups.

Embodiment 14: The analyte sensor of any one of embodiments 10-13, wherein the crosslinker is N,N-diglycidyl-4-glycidyloxyaniline.

Embodiment 15: The analyte sensor of any one of embodiments 1-14, comprising:

(i) a substrate comprising
a first side and a second side, and
at least one conductive material positioned on the first side of the substrate, (ii) a working electrode comprising a sensing material, which at least partially covers the first side of the substrate, wherein the sensing material comprises at least one enzyme, and (iii) a flux-limiting polymer membrane disposed over the at least one working electrode, wherein the flux-limiting polymer membrane comprises the polymer of formula (I).

Embodiment 16: The analyte sensor of any of embodiments 1 to 14, wherein the analyte sensor comprises (i) a substrate comprising a
a first side and a second side, and
at least one conductive material positioned on the first side of the substrate, wherein (ii) the working electrode comprises a sensing material, wherein the working electrode at least partially covers the first side of the substrate and is at least partially located on the at least one conductive material, wherein the sensing material comprises at least one enzyme.

Embodiment 17: The analyte sensor of embodiment 15 or 16, wherein the at least one conductive material positioned on the first side of the substrate is selected from gold, carbon, carbon paste and any combination thereof.

Embodiment 18: The analyte sensor of any one of embodiments 15 to 17, wherein the sensing material comprises the enzyme glucose oxidase (GOx).

Embodiment 19: The analyte sensor of any one of embodiments 15-18, wherein the sensing material further comprises at least one crosslinker.

Embodiment 20: The analyte sensor of any one of embodiment 15-19, wherein the sensing material further comprises at least one polymeric metal-containing complex.

Embodiment 21: The analyte sensor of embodiment 20, wherein the at least one polymeric metal-containing complex is selected from the group of polymeric transition metal-containing complexes.

Embodiment 22: The analyte sensor of embodiment 21, wherein the at least one polymeric transition metal-containing complex is selected from osmium-complexes, ruthenium-complexes, vanadium-complexes, cobalt-complex and iron-complexes.

Embodiment 23: The analyte sensor of any of embodiments 1-22, which comprises at least one further electrode.

Embodiment 24: The analyte sensor of embodiment 23, wherein the at least one further electrode is selected from a counter electrode, a reference electrode and a combined counter/reference electrode.

Embodiment 25: The analyte sensor of embodiment 23 or 24, wherein the at least one further electrode is a combined counter/reference electrode.

Embodiment 26: The analyte sensor of any one of embodiments 1-25, which is a two-electrode sensor particularly comprising one working electrode and one combined counter/reference electrode.

Embodiment 27: The analyte sensor of any one of embodiments 1-26, which further comprises at least one biocompatibility membrane disposed over the flux-limiting polymer membrane.

Embodiment 28: The analyte sensor of any one of embodiments 1-27, which does not comprise a biocompatibility membrane disposed over the flux-limiting polymer membrane.

Embodiment 29: The analyte sensor of any one of embodiments 1-28, wherein the flux-limiting polymer membrane is permeable for glucose.

Embodiment 30: The analyte sensor of any one of embodiments 1-29, wherein the flux-limiting polymer membrane has a diffusion coefficient for glucose, which is at least about $1\times10^{-6}$ $cm^2/s$, preferably from about $1\times10^{-6}$ $cm^2/s$ to about $1\times10^{-10}$ $cm^2/s$.

Embodiment 31: Use of an analyte sensor of any one of embodiments 1-30 for detecting at least one analyte in a sample.

Embodiment 32: A method for determining an analyte in a sample comprising using the analyte sensor of any one of embodiments 1-30.

Embodiment 33: A polymer membrane for use in an analyte sensor, wherein the polymer membrane comprises a polymer having the following formula (I):

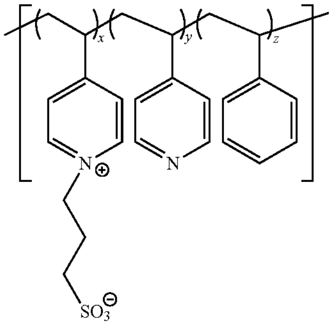

(I)

wherein x is about 2 to about 8 mol-%;
y is about 72 to about 98 mol-%; and
z is 0 to about 20 mol-%.

Embodiment 34: The polymer membrane of embodiment 33 comprising at least one feature as defined in any one of embodiments 2-15.

Embodiment 35: A liquid composition comprising a polymer having the following formula (I):

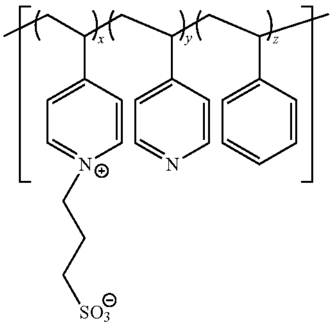

wherein x is about 2 to about 8 mol-%;
y is about 72 to about 98 mol-%; and
z is 0 to about 20 mol-%;
a crosslinker, and
a solvent.

Embodiment 36: The liquid composition of embodiment 35 comprising at least one feature as defined in any one of embodiments 2-15.

Embodiment 37: The liquid composition of embodiment 35 or 36, wherein the solvent comprises ethanol and water, particularly from about 70% to about 90% (v/v) ethanol and from about 10% to about 30% (v/v) water, particularly about 80% (v/v) ethanol and about 20% (v/v) water.

Embodiment 38: The liquid composition of any one of embodiments 35-37, which comprises from about 100 mg/ml to about 140 mg/ml polymer and from about 8 mg/ml to about 12 mg/ml crosslinker, particularly about 120 mg/ml polymer and about 10 mg/ml crosslinker.

Embodiment 39: A method for manufacturing an analyte sensor, particularly an analyte sensor according to any one of embodiments 1-30 comprising the steps:

a) providing a substrate comprising a first side and a second side, and at least one working electrode positioned on the first side of the substrate, and b) forming a layer of a polymer membrane over the at least one working electrode, wherein the polymer membrane comprises a polymer, which has the following formula (I):

(I)

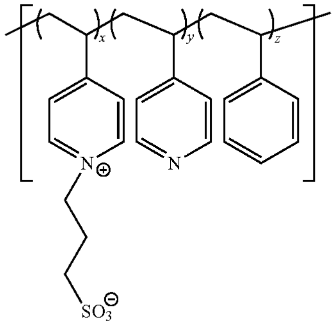

wherein x is about 2 to about 8 mol-%;
y is about 72 to about 98 mol-%; and
z is 0 to about 20 mol-%.

Embodiment 40: The method of embodiment 39 comprising at least one feature as defined in any one of embodiments 2-15.

Embodiment 41: The method of embodiment 39 or 40, wherein step b) comprises coating the at least one working electrode with a liquid composition comprising the polymer, a crosslinker and a solvent, curing the polymer and drying.

Embodiment 42: The method of embodiment 41, wherein the solvent comprises ethanol and water, particularly from about 70% to about 90% (v/v) ethanol and from about 10% to about 30% (v/v) water, particularly about 80% (v/v) ethanol and about 20% (v/v) water.

Embodiment 43: The method of embodiment 41 or 42, wherein the liquid composition comprises from about 100 mg/ml to about 140 mg/ml polymer and from about 8 mg/ml to about 12 mg/ml crosslinker, particularly about 120 mg/ml polymer and about 10 mg/ml crosslinker.

Embodiment 44: An analyte sensor comprising at least one working electrode and a flux-limiting polymer membrane disposed over the at least one working electrode, wherein the flux-limiting polymer membrane comprises a statistical copolymer, which has the following formula (Ia):

(Ia)

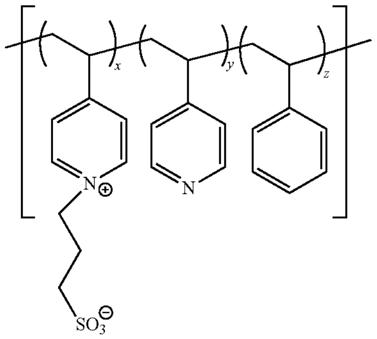

wherein x is about 2 to about 20 mol-%;
y is about 60 to about 98 mol-%; and
z is about 0 to about 20 mol-%.

Embodiment 45: The analyte sensor of embodiment 44, comprising at least one feature of as defined in any one of embodiments 1-30.

Embodiment 46: A polymer membrane for use in an analyte sensor, wherein the polymer membrane comprises a statistical polymer having the following formula (Ia):

(Ia)

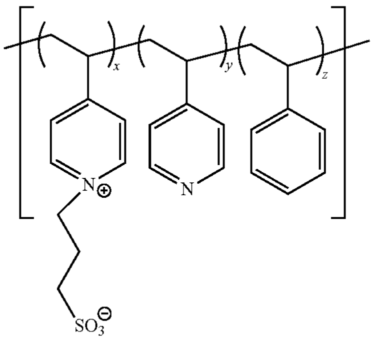

wherein x is about 2 to about 20 mol-%;
y is about 60 to about 98 mol-%; and
z is about 0 to about 20 mol-%.

Embodiment 47: The polymer membrane of embodiment 46, comprising at least one feature of as defined in any one of embodiments 33-34.

Embodiment 48: A liquid composition comprising a statistical polymer having the following formula (Ia):

(Ia)

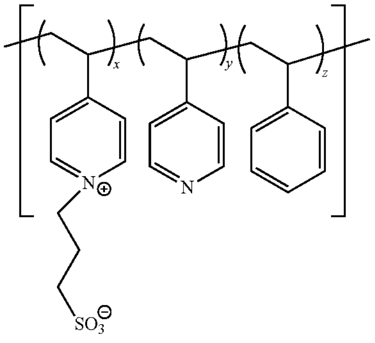

wherein x is about 2 to about 20 mol-%;
y is about 60 to about 98 mol-%; and
z is about 0 to about 20 mol-%;
a crosslinker, and
a solvent.

Embodiment 49: The liquid composition of embodiment 48, comprising at least one feature of as defined in any one of embodiments 35-38.

Embodiment 50: A method for manufacturing an analyte sensor, particularly an analyte sensor according to any one of embodiments 44-45, comprising the steps:

a) providing a substrate comprising a first side and a second side, and at least one working electrode positioned on the first side of the substrate, and b) forming a layer of a polymer membrane over the at least one working electrode, wherein the polymer membrane comprises a statistical polymer, which has the following formula (Ia):

(Ia)

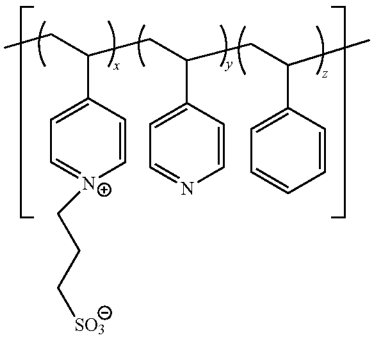

wherein x is about 2 to about 20 mol-%;
y is about 60 to about 98 mol-%; and
z is about 0 to about 20 mol-%.

Embodiment 51: The method of embodiment 50, comprising at least one feature of as defined in any one of Embodiments 35-38.

Embodiment 52: An analyte sensor comprising at least one working electrode and a flux-limiting polymer membrane disposed over the at least one working electrode, wherein the flux-limiting polymer membrane comprises a polymer having a weight average molecular weight of about 60 kDa to about 200 kDa, which has the following formula (Ia):

(Ia)

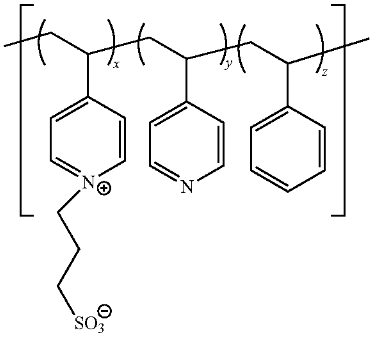

wherein x is about 2 to about 20 mol-%;
y is about 60 to about 98 mol-%; and
z is about 0 to about 20 mol-%.

Embodiment 53: The analyte sensor of Embodiment 52, comprising at least one feature of as defined in any one of embodiments 1-30.

Embodiment 54: A polymer membrane for use in an analyte sensor, wherein the polymer membrane comprises a polymer having a weight average molecular weight of about 60 kDa to about 200 kDa having the following formula (Ia): (Ia)

wherein x is about 2 to about 20 mol-%;
y is about 60 to about 98 mol-%; and
z is about 0 to about 20 mol-%.

Embodiment 55: The polymer membrane of embodiment 54, comprising at least one feature of as defined in any one of embodiments 33-34.

Embodiment 56: A liquid composition comprising a polymer having a weight average molecular weight of about 60 kDa to about 200 kDa having the following formula (Ia):

(Ia)

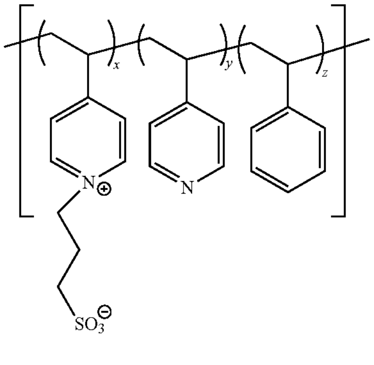

wherein x is about 2 to about 20 mol-%;
y is about 60 to about 98 mol-%; and
z is about 0 to about 20 mol-%;
a crosslinker, and
a solvent.

Embodiment 57: The liquid composition of embodiment 56, comprising at least one feature of as defined in any one of embodiments 35-38.

Embodiment 58: A method for manufacturing an analyte sensor, particularly an analyte sensor according to any one of embodiments 52-53, comprising the steps:

a) providing a substrate comprising a first side and a second side, and at least one working electrode positioned on the first side of the substrate, and b) forming a layer of a polymer membrane over the at least one working electrode, wherein the polymer membrane comprises a polymer having a weight average molecular weight of about 60 kDa to about 200 kDa, which has the following formula (Ia):

(Ia)

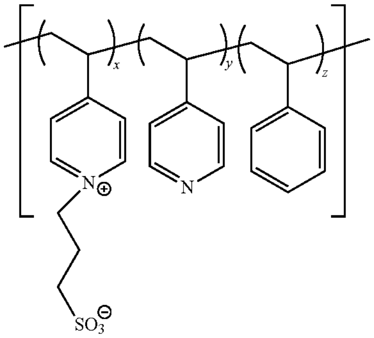

wherein x is about 2 to about 20 mol-%;
y is about 60 to about 98 mol-%; and
z is about 0 to about 20 mol-%.

Embodiment 59: The method of embodiment 58, comprising at least one feature of as defined in any one of embodiments 35-38.

Embodiment 60: An analyte sensor comprising at least one working electrode and a flux-limiting polymer membrane disposed over the at least one working electrode, wherein the flux-limiting polymer membrane comprises a polymer, which has the following formula (Ia):

(Ia)

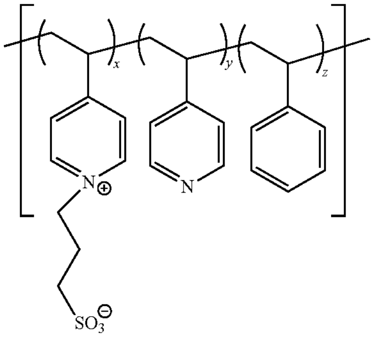

wherein x is about 2 to about 20 mol-%;
y is about 60 to about 98 mol-%; and
z is about 0 to about 20 mol-%;
wherein the polymer is crosslinked by a crosslinker, which is N,N-diglycidyl-4-glycidyloxyaniline, particularly wherein the weight ratio of polymer to crosslinker is about 8:1 (w/w) to about 16:1 (w/w), about 10:1 (w/w) to about 14:1 (w/w) and particularly about 12:1 (w/w).

Embodiment 61: The analyte sensor of Embodiment 60, comprising at least one feature of as defined in any one of Embodiments 1-30.

Embodiment 62: A polymer membrane for use in an analyte sensor, wherein the polymer membrane comprises a polymer having the following formula (Ia):

(Ia)

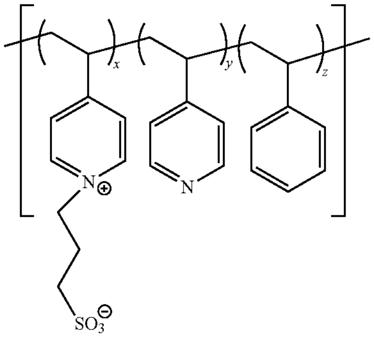

wherein x is about 2 to about 20 mol-%;
y is about 60 to about 98 mol-%; and
z is about 0 to about 20 mol-%.
wherein the polymer is crosslinked by a crosslinker, which is N,N-diglycidyl-4-glycidyloxyaniline, particularly wherein the weight ratio of polymer to crosslinker is about 8:1 (w/w) to about 16:1 (w/w), about 10:1 (w/w) to about 14:1 (w/w) and particularly about 12:1 (w/w).

Embodiment 63: The polymer membrane of Embodiment 62, comprising at least one feature of as defined in any one of Embodiments 33-34.

Embodiment 64: A liquid composition comprising a polymer having the following formula (Ia):

(Ia)

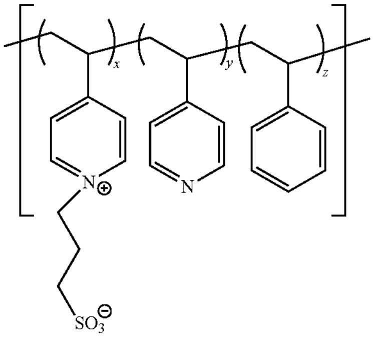

wherein x is about 2 to about 20 mol-%;
y is about 60 to about 98 mol-%; and
z is about 0 to about 20 mol-%;
a crosslinker, and
a solvent,
wherein the crosslinker is N,N-diglycidyl-4-glycidyloxyaniline, particularly wherein the weight ratio of polymer to crosslinker is about 8:1 (w/w) to about 16:1 (w/w), about 10:1 (w/w) to about 14:1 (w/w) and particularly about 12:1 (w/w).

Embodiment 65. The liquid composition of Embodiment 64, comprising at least one feature of as defined in any one of Embodiments 35-38.

Embodiment 66: A method for manufacturing an analyte sensor, particularly an analyte sensor according to any one of Embodiments 60-61, comprising the steps:

a) providing a substrate comprising a first side and a second side, and at least one working electrode positioned on the first side of the substrate, and
b) forming a layer of a polymer membrane over the at least one working electrode, wherein the polymer membrane comprises a polymer, which has the following formula (Ia):

(Ia)

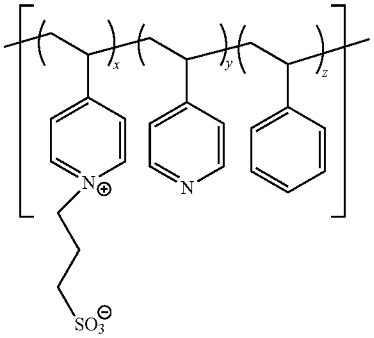

wherein x is about 2 to about 20 mol-%;
y is about 60 to about 98 mol-%; and
z is about 0 to about 20 mol-%;
wherein step (b) comprises crosslinking the polymer by a crosslinker, which is N,N-diglycidyl-4-glycidyloxyaniline, particularly wherein the weight ratio of polymer to crosslinker is about 8:1 (w/w) to about 16:1 (w/w), about 10:1 (w/w) to about 14:1 (w/w) and particularly about 12:1 (w/w).

Embodiment 67: The method of Embodiment 66, comprising at least one feature of as defined in any one of Embodiments 35-38.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
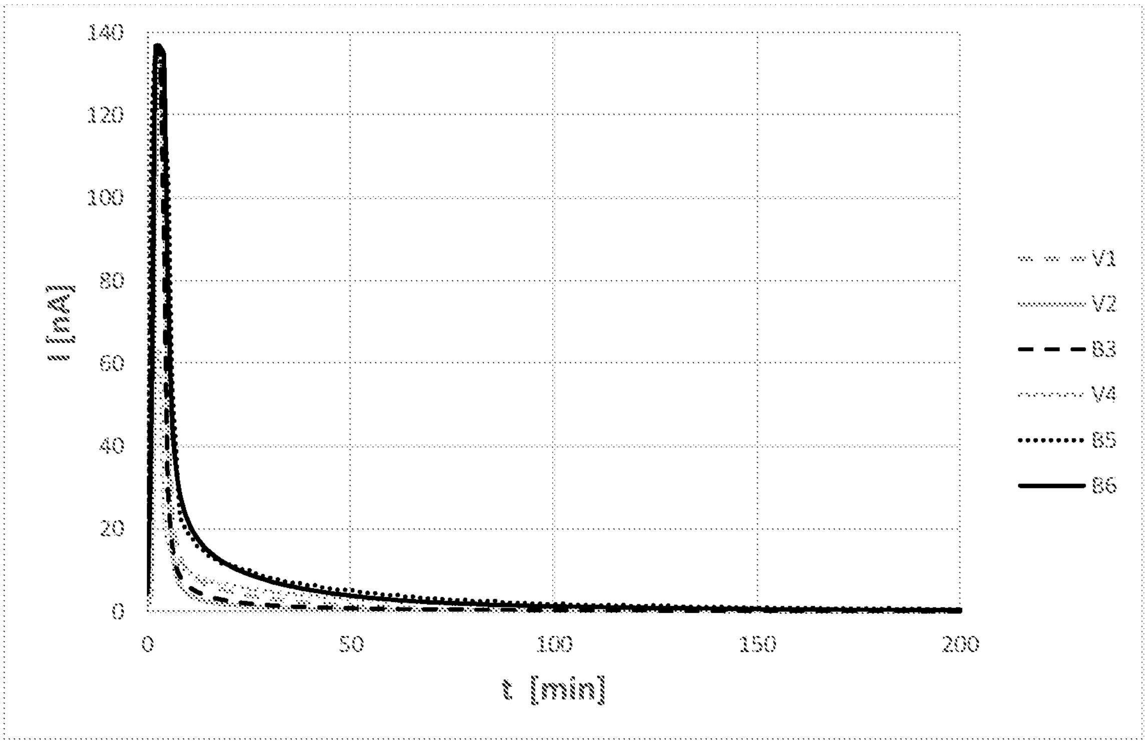
FIG. 1 shows the run-in current of six different analyte sensors.

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

This disclosure is not limited to one of the embodiments described above, but is modifiable in a great variety of ways. Those skilled in the art recognize that the embodiments according to this disclosure can easily be adapted without departing from the scope of this disclosure. Thus, simple adaptations are conceivable for the preparation of the analyte sensor. This disclosure enables the preparation of an analyte with reproducible sensor sensitivity at reduced production costs. Further characteristics, details and advantages of this disclosure follow from the wording of the claims and from the following description of practical examples based on the drawings.

The content of all literature references cited in this patent application is hereby included by reference to the respective specific disclosure content and in its entirety.

EXAMPLES

The following examples serve to illustrate this disclosure. They must not be interpreted as limiting with regard to the scope of protection.

Example 1: Preparation and Testing of Analyte Sensors Comprising Different Flux-Limiting Polymer Membrane Layers A sensor substrate based on polyethylene terephthalate and a thin layer of gold was coated with a carbon paste via doctor blading. Suitable Carbon conductive inks are available from Ercon, Inc. (Wareham, MA), E.I. du Pont de Nemours and Co. (Wilmington, DE), Emca-Remex Products (Montgomeryville, PA), or TEKRA, A Division of EIS, Inc. (New Berlin, WI). Afterwards, the carbon paste was dried for 12 h at 50° C.

A layer of sensing material was applied on the sensor substrate by cannula-coating and subsequently dried for 10 minutes at ambient temperature, e.g., about 25° C.

The sensing material comprised 57% by weight of a polymeric transition metal complex (modified poly(vinylpyridine) backbone loaded with poly(biimidizyl) Os complexes covalently coupled through a bidentate linkage), 33% by weight of glucose oxidase and 10% by weight of PEG-DGE (poly(ethylene glycol)-diglycidylether) in each case based on the sum of the percentages by weight of the polymeric transition metal complex, glucose oxidase and PEG-DGE. Water was used as solvent. The total concentration of the polymeric transition metal complex, glucose oxidase and PEG-DGE in water was 50 mg/ml.

By means of laser ablation, a working electrode having dimensions of 0.5 mm×0.6 mm and a layer thickness of 3 μm was prepared on the sensor substrate.

The working electrode of each sensor was coated with a different liquid composition comprising a poly(vinylpyridine)-based polymer and a crosslinker as indicated in Table 1. In all cases, as solvent a mixture of 80% (v/v) ethanol and 20% (v/v) water was used. In the table, Oxi-Ani means N,N-diglycidyl-4-glycidyloxyaniline and PEG-DGE 200 means poly(ethylene glycol)-diglycidylether with a number average molecular weight of 200 Da.

TABLE 1

| | Poly(vinylpyridine)-based polymer | | | | Weight |
|---|---|---|---|---|---|
| Example | sulfonato-vinyl-pyridinium [mol-%] | 4-vinyl-pyridine [mol-%] | styrene [mol-%] | Cross-linker | ratio polymer/crosslinker |
| V1 | 10 | 80 | 10 | Oxi-Ani | 12:1 |
| V2 | 10 | 80 | 10 | PEG-DGE 200 | 8:1 |
| B3 | 5 | 85 | 10 | PEG-DGE 200 | 8:1 |
| V4 | 0 | 90 | 10 | Oxi-Ani | 12:1 |
| B5 | 5 | 85 | 10 | Oxi-Ani | 12:1 |
| B6 | 5 | 95 | 0 | Oxi-Ani | 12:1 |

After coating, the sensors were dried and the polymer crosslinked at room temperature to obtain a flux-limiting membrane on the working electrode. Silver/silver chloride was used as combined counter reference electrode.

Four sensors were prepared for each of the different flux limiting membranes. The measurements described below were carried out for each of the four sensors and the median of the resulting measurements was determined. All measurements were carried out in vitro. All descriptions below refer to the median of the measurements.

For all sensors, the current was measured over a time period of about 10 days with varying amount of glucose. The measurement was carried out in a phosphate buffer solution. After a run-in time of about 6 hours, glucose was added. The glucose was exchanged regularly by flushing with phosphate buffer and glucose phosphate buffer in certain ratios for each step by a LC-system (Jasco LC-4000 series). Each step had a duration of 90 minutes in the pyramide phase. The following glucose concentrations were used: 0 mg/dl, 36 mg/dl, 72 mg/dl, 108 mg/dl, 144 mg/dl, 216 mg/dl, 306 mg/dl, 414 mg/dl. 468 mg/dl, 360 mg/dl, 270 mg/dl, 180 mg/dl, 126 mg/dl, 90 mg/dl, 54 mg/dl, 14.4 mg/dl. The sensitivity was displayed at a glucose concentration of 180 mg/dl.

FIG. 1 shows the median run in time tin minutes for the different sensors. It can be seen that the sensors comprising poly(ethylene glycol)-diglycidylether as crosslinker have a reduced run-in time in comparison to sensors which comprise N,N-diglycidyl-4-glycidyloxyaniline as crosslinker. However, their run-in time is still sufficiently short to allow usage as continuous glucose sensor.

Figure 2:
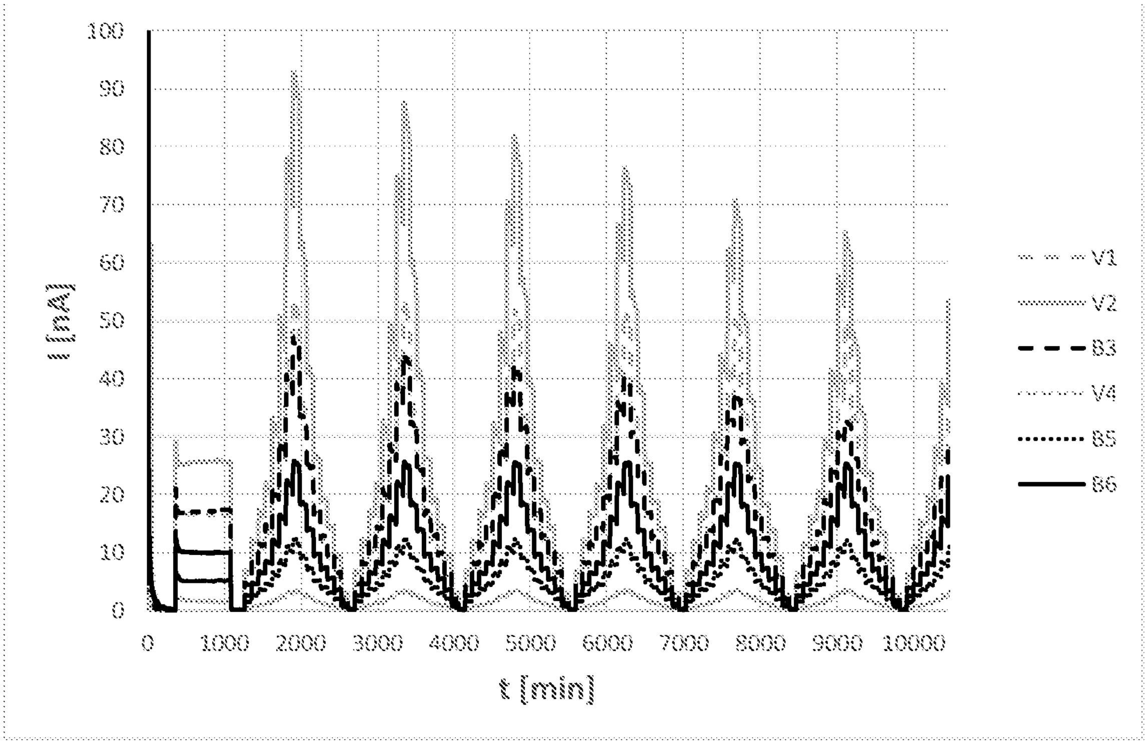
FIG. 2 shows the current of six different analyte sensors over a period of about 10 days.

FIG. 2 shows the current I over the time tin minutes for the different sensors. It can be seen that the current of the sensors comprising 10 mol-% of sulfonato-vinylpyridinium in the poly(vinylpyridine)-based polymer decreases rapidly over time whereas sensors comprising 5 mol-% sulfonato-vinylpyridinium have an almost constant current over the measurement period.

Thus, sensors B3, B5 and B6 exhibit a significantly increased long-term stability over sensors V1, V2 and V4.

Figure 3:
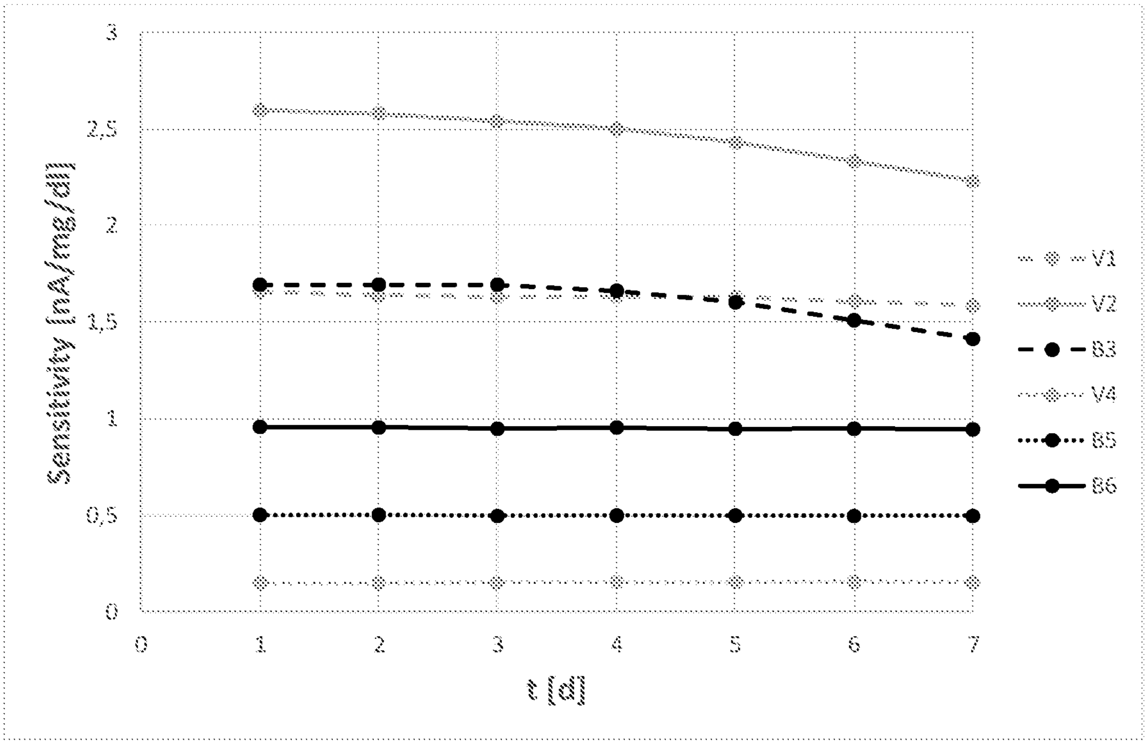
FIG. 3 shows long-term changes in the sensitivities of analyte sensors comprising different flux-limiting polymer membranes at a glucose concentration of 180 mg/dL.

FIG. 3 shows the sensitivity in nA/mg/dl over time tin days for the different sensors. It can be seen that the sensitivity decrease in sensors B3, B5 and B6 is lower than in sensors V1, V2 and V4. This is advantageous as it indicates a higher stability of the sensor over longer time.

Example 2: Analyte Sensors Comprising Different Flux-Limiting Polymer Membrane Layers A sensor substrate based on polyethylene terephthalate was coated with a carbon paste via doctor blading. Suitable Carbon conductive inks are available from Ercon, Inc. (Wareham, MA), E.I. du Pont de Nemours and Co. (Wilmington, DE), Emca-Remex Products (Montgomeryville, PA), or TEKRA, A Division of EIS, Inc. (New Berlin, WI). Afterwards, the carbon paste was dried for 12 h at 50° C.

A layer of sensing material was applied on the sensor substrate by cannula-coating and subsequently dried for 10 minutes at ambient temperature, e.g., about 25° C.

The sensing material comprised 57% by weight of a polymeric transition metal complex (modified poly(vinylpyridine) backbone loaded with poly(biimidizyl) Os complexes covalently coupled through a bidentate linkage), 33% by weight of glucose oxidase and 10% by weight of PEG-DGE (poly(ethylene glycol)-diglycidylether) in each case based on the sum of the percentages by weight of the polymeric transition metal complex, glucose oxidase and PEG-DGE. Water was used as solvent. The total concentration of the polymeric transition metal complex, glucose oxidase and PEG-DGE in water was 50 mg/ml.

By means of laser ablation, a working electrode having dimensions of 0.5 mm×0.6 mm and a layer thickness of 4 μm was prepared on the sensor substrate.

The working electrode of each sensor was coated (dip coating, tree times) with a different liquid composition comprising a poly(vinylpyridine)-based polymer and a crosslinker as indicated in Table 2. In all cases, as solvent a mixture of 80% (v/v) ethanol and 20% (v/v) water was used. In the table, Oxi-Ani means N,N-diglycidyl-4-glycidyloxyaniline and PEG-DGE 200 means poly(ethylene glycol)-diglycidylether with a number average molecular weight of 200 Da.

Sensors V1, V2 and B3 in Table 2 were prepared as in Example 1, V1, V2 and B3 in Table 2 correspond to V1, V2 and B3 in Table 1.

In Table 2, Mn is the number average molecular weight of the polyvinylpyridine based polymer. PDI is the polydispersity index of the polyvinylpyridine based polymer.

TABLE 2

| | Polyvinylpyridine based polymer | | | | | | | | | | | |
|---|---|---|---|---|---|---|---|---|---|---|---|---|
| Example | sulfonato-vinyl-pyridinium [mol-%] | 4-vinyl-pyridine [mol-%] | Styrene [mol-%] | Crosslinker | weight ratio polymer/crosslinker | Mn [kDa] | PDI | sensitivity day 1 at 180 mg/dl | average drift/day [%] at 180 mg/dl | average drift/day [%] at 468 mg/dl | run in time [min] |
| V1 | 9.9 | 80.8 | 9.3 | Oxi-Ani | 12:1 | — | — | 1.660 | −1.00 | −2.10 | 130 |
| V2 | 9.9 | 80.8 | 9.3 | PEG-DGE 200 | 8:1 | — | — | 2.600 | −3.30 | −6.50 | 130 |
| B3 | 4.3 | 87.5 | 8.2 | PEG-DGE 200 | 8:1 | — | — | 1.690 | −2.60 | −6.10 | 170 |
| V7 | 1.3 | 88.2 | 10.5 | Oxi-Ani | 12:1 | 61 | 1.7 | 0.140 | −0.01 | 0.58 | 362 |
| B8 | 2.7 | 86.8 | 10.5 | Oxi-Ani | 12:1 | 61 | 1.7 | 0.201 | −0.05 | −0.28 | 266 |
| B9 | 4.1 | 85.4 | 10.5 | Oxi-Ani | 12:1 | 61 | 1.7 | 0.336 | −0.75 | −0.97 | 206 |
| B10 | 4.8 | 84.7 | 10.5 | Oxi-Ani | 12:1 | 61 | 1.7 | 0.446 | −1.67 | −1.66 | 166 |
| B11 | 6.2 | 83.3 | 10.5 | Oxi-Ani | 12:1 | 61 | 1.7 | 0.470 | −1.02 | −1.20 | 153 |
| B12 | 7.0 | 82.5 | 10.5 | Oxi-Ani | 12:1 | 61 | 1.7 | 0.679 | −3.07 | −4.41 | 111 |
| B13 | 4.8 | 85.9 | 9.3 | Oxi-Ani | 12:1 | 74 | 1.7 | 0.224 | −0.12 | 0.22 | 279 |
| B14 | 4.9 | 85.0 | 10.1 | Oxi-Ani | 12:1 | 100 | 1.8 | 0.975 | −1.50 | −1.26 | 54 |
| B15 | 4.6 | 85.7 | 9.7 | Oxi-Ani | 12:1 | 55 | 1.7 | 0.325 | −0.62 | −0.69 | 203 |
| B16 | 5.1 | 83.9 | 11.0 | Oxi-Ani | 12:1 | 56 | 1.8 | 0.375 | −0.66 | −0.73 | 175 |
| B17 | 4.9 | 95.1 | 0.0 | Oxi-Ani | 12:1 | 58 | 1.9 | 0.666 | −2.30 | −2.97 | 123 |
| B18 | 4.5 | 88.5 | 7.0 | Oxi-Ani | 12:1 | 58 | 1.7 | 0.422 | −0.30 | −0.24 | 186 |
| B19 | 4.9 | 82.2 | 12.9 | Oxi-Ani | 12:1 | 56 | 1.6 | 0.265 | −0.38 | −0.40 | 246 |
| B20 | 4.8 | 76.2 | 19.0 | Oxi-Ani | 12:1 | 50 | 1.6 | 0.134 | −0.02 | −0.23 | 330 |
| B21 | 5.0 | 91.7 | 3.3 | Oxi-Ani | 12:1 | 52 | 1.8 | 0.611 | −2.24 | −2.85 | 128 |
| B22 | 4.3 | 87.5 | 8.2 | Oxi-Ani | 12:1 | — | — | 0.380 | −0.80 | −1.40 | 180 |
| B23 | 4.8 | 87.6 | 7.6 | — | — | — | — | 1.1 | −3.80 | −2.20 | 1000 |
| B24 | 4.8 | 87.6 | 7.6 | Oxi-Ani | 60:1 | — | — | 0.88 | −1.70 | −1.90 | 130 |
| B25 | 4.8 | 87.6 | 7.6 | Oxi-Ani | 24:1 | — | — | 0.65 | −1.70 | −2.50 | 180 |
| B26 | 4.3 | 87.5 | 8.2 | Oxi-Ani | 16:1 | — | — | 0.46 | 0 | 0.2 | 300 |
| B27 | 4.3 | 87.5 | 8.2 | Oxi-Ani | 14:1 | — | — | 0.44 | −0.6 | −0.4 | 250 |
| B28 | 4.3 | 87.5 | 8.2 | Oxi-Ani | 12:1 | — | — | 0.49 | −0.4 | −0.8 | 180 |
| B29 | 4.3 | 87.5 | 8.2 | Oxi-Ani | 10:1 | — | — | 0.45 | −0.5 | −0.1 | 190 |
| B30 | 4.3 | 87.5 | 8.2 | Oxi-Ani | 8:1 | — | — | 0.44 | −0.7 | −0.6 | 150 |
| B31 | 4.5 | 86.7 | 8.8 | Oxi-Ani | 12:1 | 28 | 1.8 | 0.460 | −0.89 | −0.69 | 135 |

After coating, the sensors were dried to obtain the flux limiting membrane on the working electrode. In case a crosslinker was comprised, the polymer was crosslinked at room temperature.

Silver/silver chloride was used as combined counter/reference electrode.

Four sensors were prepared for each of the different flux limiting membranes. The measurements described below were carried out for each of the four sensors and the median of the resulting measurements was determined. All measurements were carried out in vitro. All descriptions below refer to the median of the measurements.

For all sensors, the current was measured over a time period of about 7 days with varying amount of glucose. The measurement was carried out in a phosphate buffer solution.

The sensitivity was measured at the first day at a glucose concentration of 180 mg/dl. The average drift was calculated at a glucose concentration of 180 mg/dl and of 468 mg/dl.

As can be seen from Table 2, the sensors comprising the inventive flux-limiting membranes exhibit a reduced drift compared to comparative sensors while having still a sufficiently short run-in time. At the same time they still have a good sensitivity.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. An analyte sensor, comprising:

at least one working electrode; and a flux-limiting polymer membrane disposed over the at least one working electrode, wherein the flux-limiting polymer membrane comprises a polymer having the following formula (I):

(I)

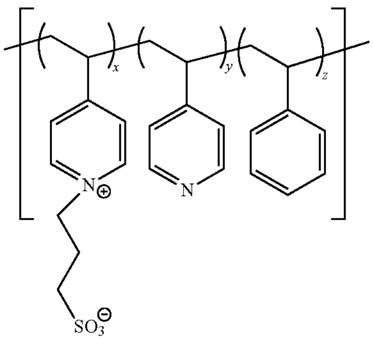

wherein x is about 2 to about 5 mol-%;

y is about 72 to about 98 mol-%; and z is 0 to about 4 mol-%.

2. The analyte sensor of claim 1, wherein the polymer is a statistical copolymer.

3. The sensor of claim 1, wherein the polymer has a weight average molecular weight in the range of about 60 kDa to about 200 kDa.

4. The analyte sensor of claim 1, wherein the polymer of formula (I) in the flux-limiting polymer membrane is cross-linked by a crosslinker, wherein the weight ratio of polymer to crosslinker in the flux-limiting polymer membrane is selected from the group consisting of about 8:1 (w/w) to about 16:1 (w/w), about 10:1 (w/w) to about 14:1 (w/w) and about 12:1 (w/w).

5. The analyte sensor of claim 4, wherein the crosslinker is N,N-diglycidyl-4-glycidyloxyaniline.

6. The analyte sensor according to claim 5, wherein z is about 0 mol. %.

7. The analyte sensor of claim 1, further comprising a substrate having first and second sides and a conductive material positioned on the first side of the substrate, wherein the working electrode comprises a sensing material, wherein the working electrode at least partially covers the first side of the substrate, further wherein the sensing material comprises at least one enzyme.

8. The analyte sensor of claim 7, wherein the at least one conductive material positioned on the first side of the substrate is selected from gold, carbon, carbon paste and any combination thereof, and/or wherein the sensing material comprises the enzyme glucose oxidase (GOx).

9. The analyte sensor of claim 1, further comprising a combined counter/reference electrode.

10. The analyte sensor of claim 1, further comprising at least one biocompatibility membrane disposed over the flux-limiting polymer membrane.

11. A method for determining an analyte in a sample, comprising using the analyte sensor of claim 1.

12. The liquid composition, according to claim 1, wherein z is about 0 mol. %.

13. A polymer membrane for use in an analyte sensor, wherein the polymer membrane comprises a polymer having the following formula (I):

(I)

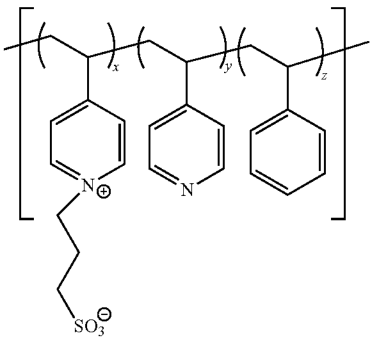

wherein x is about 2 to about 5 mol-%;

y is about 72 to about 98 mol-%; and z is 0 to about 4 mol-%.

14. The polymer membrane according to claim 13, wherein z is about 0 mol. %.

15. A liquid composition comprising a polymer having the following formula (I):

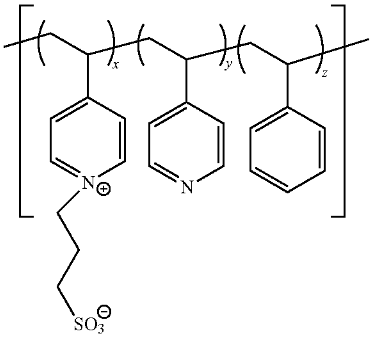

(I)

wherein x is about 2 to about 5 mol-%;

y is about 72 to about 98 mol-%; and z is 0 to about 4 mol-%;

a crosslinker; and a solvent.

16. The liquid composition of claim 15, wherein the solvent comprises ethanol and water in an amount selected from the group consisting of (i) from about 70% to about 90% (v/v) ethanol and from about 10% to about 30% (v/v) water, and (ii) from about 80% (v/v) ethanol and about 20% (v/v) water.

17. The liquid composition of claim 15, comprising from about 100 mg/ml to about 140 mg/ml polymer and from about 8 mg/ml to about 12 mg/ml crosslinker.

18. The liquid composition of claim 17, comprising about 120 mg/ml polymer and about 10 mg/ml crosslinker.

19. A method for manufacturing an analyte sensor according to claim 1, comprising:

a) providing a substrate having a first side and a second side, and at least one working electrode positioned on the first side; and b) forming a layer of a flux-limiting polymer membrane over the at least one working electrode, wherein the flux-limiting polymer membrane comprises a polymer having the following formula (I):

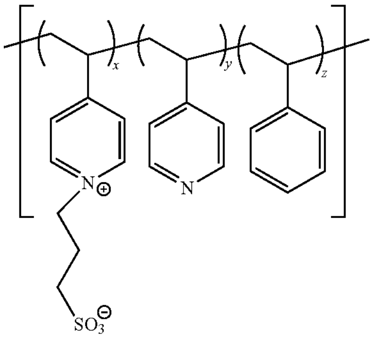

(I)

wherein x is about 2 to about 5 mol-%;

y is about 72 to about 98 mol-%; and z is 0 to about 4 mol-%.

20. The method according to claim 19, wherein z is about 0 mol. %.

* * * * *